(12) United States Patent
Tolkmitt et al.

(10) Patent No.: US 6,969,961 B2
(45) Date of Patent: Nov. 29, 2005

(54) METHOD FOR CONTROLLING A ROTATION SPEED OF A SLAVE DRIVE, A CORRESPONDING CONTROLLER AND A CORRESPONDING MACHINE

(75) Inventors: Tom Tolkmitt, Fürth (DE); Heino De Levie, Hessdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/935,735

(22) Filed: Sep. 7, 2004

(65) Prior Publication Data

US 2005/0077857 A1    Apr. 14, 2005

(30) Foreign Application Priority Data

Sep. 5, 2003  (DE) ............................... 103 41 091
May 21, 2004 (DE) ...................... 10 2004 025 118

(51) Int. Cl.[7] ............................................. H02P 1/54

(52) U.S. Cl. ...................... 318/34; 318/625; 318/85; 318/49; 360/73.02

(58) Field of Search ........................... 318/34, 39, 41, 318/47, 49, 59, 66, 90, 85, 625; 360/69, 73.02

(56) References Cited

U.S. PATENT DOCUMENTS

| | | | | |
|---|---|---|---|---|
| 4,084,083 A | * | 4/1978 | McNally et al. | 700/69 |
| 5,416,648 A | * | 5/1995 | Jeppson et al. | 360/73.02 |
| 5,656,903 A | * | 8/1997 | Shui et al. | 318/568.1 |
| 5,841,604 A | * | 11/1998 | Supino | 360/73.03 |
| 6,142,760 A | * | 11/2000 | Niizeki et al. | 425/145 |
| 6,598,859 B1 | * | 7/2003 | Kureck et al. | 254/292 |

FOREIGN PATENT DOCUMENTS

EP    0 704 781 A    4/1996

* cited by examiner

*Primary Examiner*—Rina Duda
(74) *Attorney, Agent, or Firm*—Henry M. Feiereisen

(57) ABSTRACT

A method for controlling the rotation speed of a slave drive is described, where a reference rotation speed and a reference position is provided to a controller. The controller determines an estimated acceleration curve for the slave drive based on an instantaneous rotation speed, an instantaneous position and a maximum rotation-speed-dependent acceleration of the slave drive. The estimated acceleration curve for the slave drive is hereby determined so that after a compensation time, the rotation speed of the slave drive is equal to the reference rotation speed and the position of the slave drive is also equal to an expected reference position, which is determined by the controller based on the reference position, the reference rotation speed and the compensation time.

19 Claims, 6 Drawing Sheets

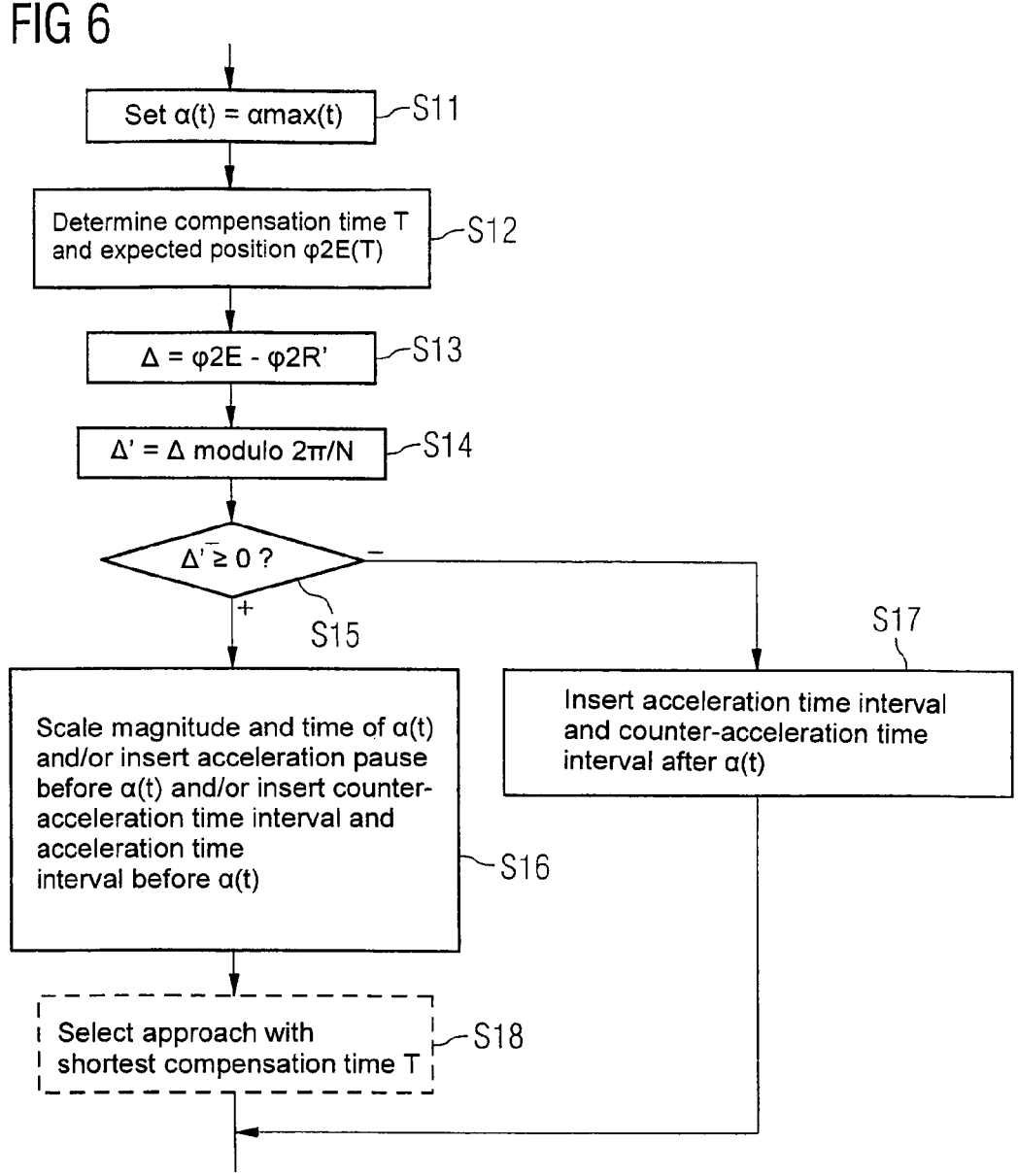

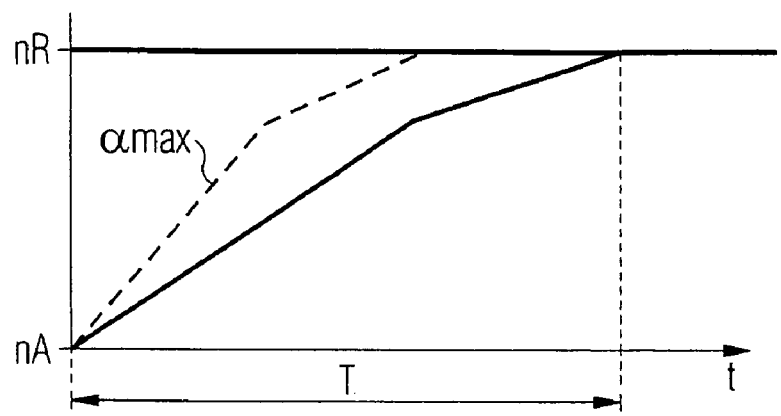
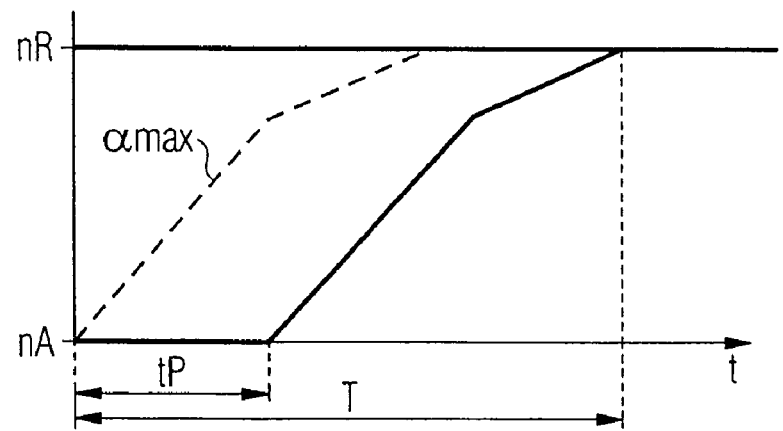

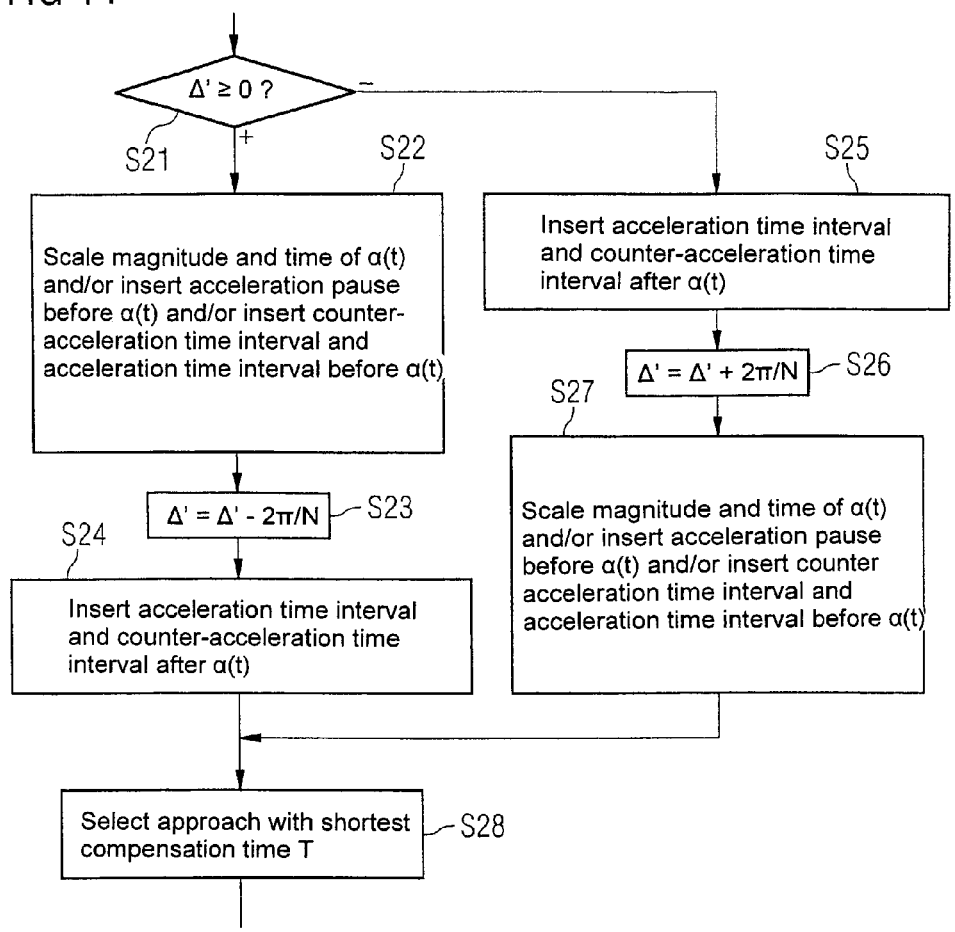

METHOD FOR CONTROLLING A ROTATION SPEED OF A SLAVE DRIVE, A CORRESPONDING CONTROLLER AND A CORRESPONDING MACHINE

CROSS-REFERENCES TO RELATED APPLICATIONS

This application claims the priorities of German Patent Applications, Serial Nos. 103 41 091.0, filed Sep. 5, 2003, and 10 2004 025 118.5, filed May 21, 2004, pursuant to 35 U.S.C. 119(a)–(d), the disclosure of which is incorporated herein by reference.

BACKGROUND OF THE INVENTION

The present invention relates to a method for controlling the rotation speed of a slave drive, and also to a controller for a slave drive carrying out the method and a machine with a slave drive controlled by such controller.

Nothing in the following discussion of the state of the art is to be construed as an admission of prior art.

A method for controlling the rotation speed is disclosed, for example, in European patent publication no. EP 0 704 781 A, which describes a drive for, for example, a machine tool, which is controlled so as to minimize contour errors by matching a feed rate to the reference rotation speed at a predetermined point in time.

Although conventional rotation speed control methods operate satisfactorily, they are unable to completely eliminate residual contour errors, in particular, if the reference rotation speed is provided to the controller not only once, but continuously.

It would therefore be desirable and advantageous to provide an improved method for controlling the rotation speed, which obviates prior art shortcomings and is able to specifically eliminate residual contour errors of slave drives.

SUMMARY OF THE INVENTION

According to one aspect of the present invention, a method for controlling the rotation speed of a slave drive includes providing a reference rotation speed and a reference position to a controller for the slave drive, wherein the controller determines an estimated acceleration curve for the slave drive based on an instantaneous rotation speed, an instantaneous position and a maximum rotation-speed-dependent acceleration of the slave drive. The estimated acceleration curve for the slave drive is hereby determined so that after a compensation time, the rotation speed of the slave drive is equal to the reference rotation speed and the position of the slave drive is also equal to an expected reference position, which is determined by the controller based on the reference position, the reference rotation speed and the compensation time. The controller then controls the slave drive according to the determined acceleration curve.

The rotation speed control method of the invention is particularly suited for synchronizing the slave drive with a master drive. Advantageously, the controller controls the slave drive, so that the reference rotation speed is maintained when the reference rotation speed and the reference position are reached simultaneously. Such synchronization processes occur, for example, with turning machines, where a machine workpiece is transferred to a slave spindle on the fly, i.e., while the master spindle still rotates. In principle, the present invention can also be used with position axes. In both cases, the reference rotation speed and/or the reference position correspond to the corresponding desired, expected, or actual values of the master drive.

In principle, the controller can determine the acceleration curve numerically. However, advantageously, the controller can determine the acceleration curve analytically, which tends to be more accurate and also faster than a numerical computation.

According to an advantageous embodiment of the invention, the acceleration curve can be determined analytically if the slave drive has a constant maximum acceleration value below a ceiling speed and a smaller acceleration value above the ceiling speed, whereby the lower value is either constant or decreases above the ceiling speed with increasing rotation speed, for example, linearly or hyperbolically.

When synchronizing a plurality of rotating bodies, it is frequently only important to synchronize the actual rotary motion and not the number of the actual revolutions. The position of the driven element need only be known within one revolution, so that the reference position is determined modulo $2*\pi/N$, wherein N has an integer value.

Advantageously, the acceleration curve for the slave drive can be readily determined if the controller initially sets the acceleration curve equal to a maximum acceleration value and determines an expected position of the slave drive assuming that the server drive is accelerated to the reference rotation speed with the set acceleration curve, and initially also sets a compensation time. The controller then compares the expected position with the expected reference position, varies the acceleration curve based on the comparison, and adapts the corresponding compensation time and the corresponding expected reference position accordingly. In this way, the slave drive simultaneously reaches the reference rotation speed and the expected reference position.

The acceleration curve can be varied in several ways. For example, if the expected position leads the expected reference position, then the controller can scale the acceleration curve linearly, or the controller can insert an acceleration pause before the acceleration curve, or the controller can insert a counter-acceleration time interval and an additional acceleration time interval before the acceleration curve. These three approaches can be employed alternatively or in combination. Conversely, if the expected position trails the expected reference position, then the controller can insert an additional acceleration time interval and a counter-acceleration time interval after the acceleration curve.

According to another advantageous embodiment of the invention, the controller can determine the acceleration curve so that the slave drive reaches the reference rotation speed and the expected reference position in a time-optimized manner, in particular, if the reference position with respect to the servo element is determined only modulo $2*\pi/N$. For example, a compensation time can be determined for each of the afore-described approaches, and the determined shortest compensation time can be used.

According to another aspect of the invention, a controller for a slave drive is disclosed that carries out the afore-described rotation speed control method, as well as a machine with a controller that controls the slave drive.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 shows a flow diagram for selecting an optimized acceleration curve;

FIGS. 7 to 10 show rotation speed diagrams as a function of time for the acceleration curves described in FIG. 6; and FIG. 11 shows a flow diagram for minimizing the compensation time.

DETAILED DESCRIPTION OF PREFERRED EMBODIMENTS

Figure 1:
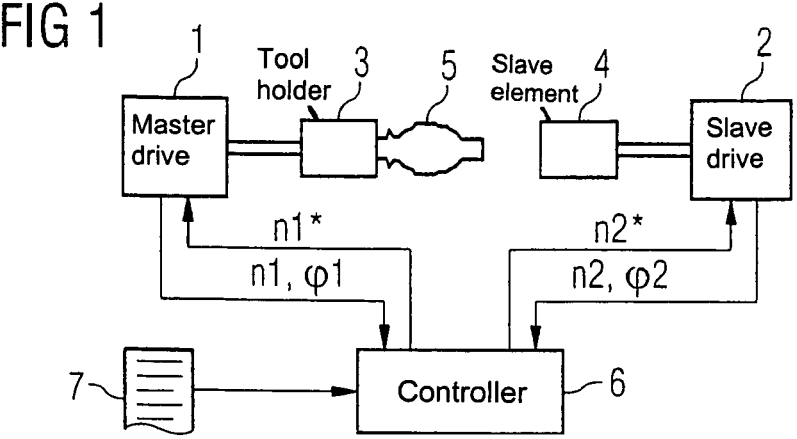
FIG. 1 shows schematically a machine with a master drive and a slave drive controlled according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a machine, such as a turning machine or lathe as an example of a machine tool, with a master drive 1 and a slave drive 2. The master drive 1 drives a master element 3, for example a rotating tool holder 3. The slave drive 2 drives a slave element 4, which can be a rotating workpiece holder 4. The master element 3 holds, for example, a workpiece 5 to be machined, which is then to be transferred to the slave element 4 while the master element 3 is rotating, i.e., on the fly.

The machine also includes a controller 6 that controls the drives 1,2, the master and slave elements 3, 4, as well as other elements in the machine not shown in FIG. 1 for sake of clarity. The controller 6 is programmed with a computer program 7, which causes the controller 6 to execute a rotation speed control process for the slave drive 2, which will be describes in detail hereinafter with reference to FIG. 2.

Figure 2:
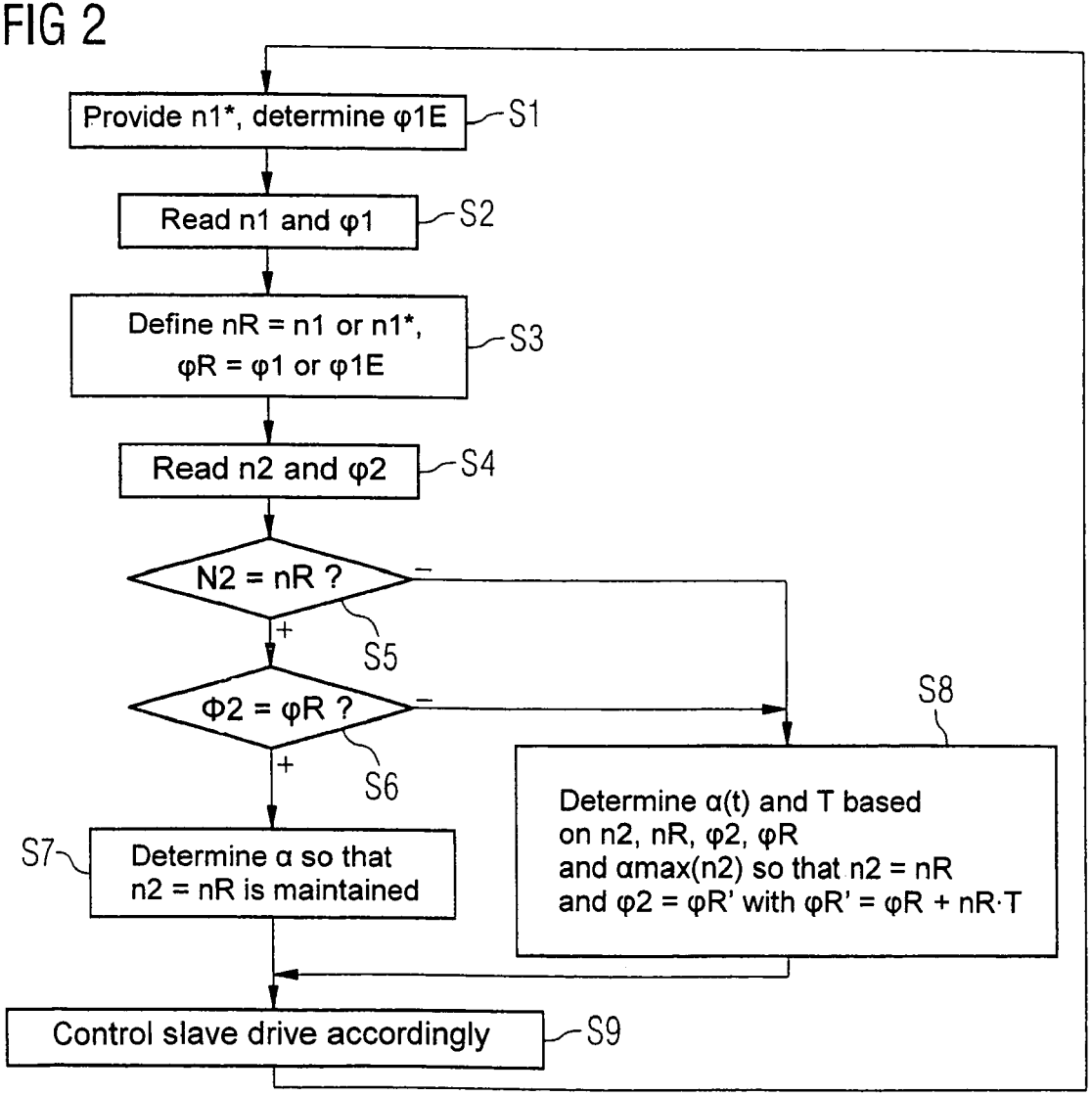
FIG. 2 shows a flow diagram for controlling the slave drive of FIG. 1.

Referring now to FIG. 2, the controller 6 controls the master drive 1 by presetting a desired rotation speed value n1* for the master drive 1, step S1. The controller 6 simultaneously updates an expected angular position $\phi 1E$ of the master drive 1 based on the desired rotation speed n1*. The controller 6 then receives from the master drive 1 the actual rotation speed n1 of the master drive 1 as well as its angular position $\phi 1$, step S2.

In step S3, the controller 6 determines a reference rotation speed nR and a reference position $\phi R$. Alternatively, the actual values n1, $\phi 1$ of the master drive 1 or the desired rotation speed n1* and the expected angular position $\phi 1E$ can be used.

In step S4, the controller receives from the slave drive 2 the actual rotation speed n2 and actual angular position $\phi 2$ of the slave drive 2. The controller 6 then compares in steps S5 and S6 the actual rotation speed n2 of the slave drive 2 with the reference rotation speed nR and the angular position $\phi 2$ with the reference position $\phi R$. If both values are identical, then the controller 6 executes step S7, otherwise step S8.

If the slave drive 2 has already reached the reference rotation speed nR and also the reference position $\phi R$, then the controller 6 determines in step S7 an acceleration value a for the slave drive 2. This acceleration value $\alpha$ is determined so that the slave drive 2 maintains the reference rotation speed nR, which can be easily achieved, because the slave drive 2 typically has at least the same dynamic characteristic as the master drive 1, and because the master element 3 and the servo element 4 tend to have a similar construction. Accordingly, the same control signal that is transmitted to the master drive 1 is also transmitted to the slave drive 2.

However, if at least one of the two reference values nR, $\phi R$ has not yet been reached, then the controller 6 predicts in step S8 an acceleration curve $\alpha(t)$ for the slave drive 2. The controller 6 determines the acceleration curve $\alpha(t)$ based on the rotation speed n2, the actual angular position $\phi 2$, and a maximum acceleration $\alpha max$ of the slave drive 2. The controller 6 determines the acceleration curve $\alpha(t)$ for the slave drive 2 so that, after a compensation time T, the rotation speed n2 of the slave drive is equal to the reference rotation speed nR and simultaneously the position $\phi 2$ of the slave drive 2 is equal to an expected reference position $\phi R'$.

The controller 6 determines the expected reference position $\phi R'$ based on the reference position $\phi R$, the reference rotation speed nR and the compensation time T. It is assumed that the reference rotation speed nR remains constant and the reference position $\phi R$ changes accordingly. Step S8 will be explained below in more detail with reference to FIG. 6.

Immediately after steps S7 and/or S8, the controller 6 executes step S9 by controlling the slave drive 2 with a corresponding desired rotation speed value n2* according to the acceleration value $\alpha$ determined in step S7 or according to the acceleration curve $\alpha(t)$ determined in step S8.

The controller 6 then returns to and executes step S1. In the way, an updated reference rotation speed nR and an updated reference position $\phi R$ are continuously provided to the controller 6.

Figure 3:
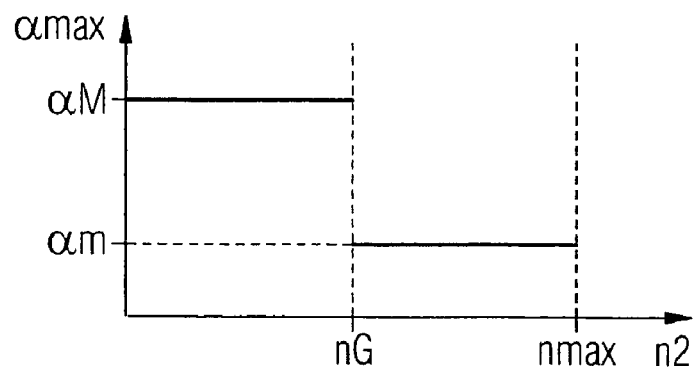
FIG. 3 shows a first embodiment of a rotation speed-dependent acceleration of a slave drive.
Figure 4:
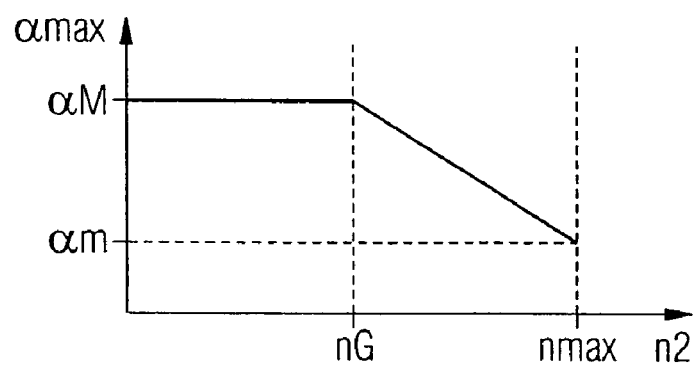
FIG. 4 shows a second embodiment of a rotation speed-dependent acceleration of a slave drive.
Figure 5:
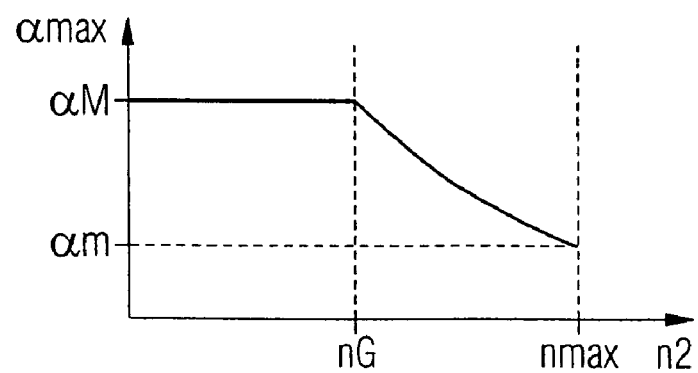
FIG. 5 shows a third embodiment of a rotation speed-dependent acceleration of a slave drive.

As shown in FIGS. 3 to 5, the maximum acceleration $\alpha max$ of the slave drive 2 has a constant maximum value $\alpha M$ below a ceiling speed nG. The maximum acceleration $\alpha max$ has a lower value above the ceiling speed nG and below a maximum rotation speed nmax. The acceleration at the maximum rotation speed nmax is designated as $\alpha m$.

As shown in FIG. 3, the maximum acceleration $\alpha max$ of the slave drive 2 can be, for example, a constant value above the ceiling speed nG. Typically, as shown in FIGS. 4 and 5, the maximum acceleration $\alpha max$ of the slave drive 2 decreases above the ceiling speed nG with increasing rotation speed n2 of the slave drive 2. This decrease with increasing rotation speed n2 can be in linear (see FIG. 4) or hyperbolic (see FIG. 5).

A number of boundary conditions of the slave drive 2 determine the curve form of the maximum acceleration $\alpha max$. However, in each of the situations depicted in FIGS. 3 to 5, the controller 6 can determine the acceleration curve $\alpha(t)$ analytically. A numeric approximation is therefore not necessary.

In order to determine in step S8 of FIG. 2 the desired acceleration curve $\alpha(t)$ as a function of time, the controller 6 sets according to FIG. 6 in step S11 the acceleration curve $\alpha(t)$ initially equal to the maximum acceleration $\alpha max$. In step S12, the controller 6 then determines the compensation time T necessary to reach the reference rotation speed nR as well as an expected position φ2E of the slave drive 2, assuming that the slave drive were accelerated with this acceleration α(t) to the reference rotation speed nR.

Rotation speed ranges where the maximum acceleration αmax is constant are easy to handle, because the rotation speed n2 of the slave drive 2 is in these ranges a linear function of time t and the angular position φ2 changes as a quadratic function of time t. These rotation speed ranges will therefore not discussed further since they can also be easily handled. Only those situations will be discussed below where the maximum acceleration αmax decreases linearly or hyperbolically with the rotation speed n2.

If the maximum acceleration αmax decreases hyperbolically with the rotation speed n2, then there exists within this range a time interval Δt required to reach a final rotation speed nE from an initial rotation speed nA. This time interval Δt is defined by the formula $$\Delta t = (nE^2 - nA^2 - 2nD(nE - nA))/2\alpha P \quad (1)$$

The change Δφ in the angular position during this time interval Δt is $$\Delta\phi = ((nE^3 - nA^3)/3 - (nE^2 - nA^2)nD/2)\alpha P \quad (2)$$

wherein nD and αP are parameters which can be determined by the following equations (3) and (4)

$$nD = (\alpha M \cdot nG - \alpha m \cdot nmax)/(\alpha M - \alpha m) \quad (3)$$

$$\alpha P1 = \alpha M \cdot (nG - nD) \quad (4)$$

Conversely, if they maximum acceleration αmax decreases linearly with the rotation speed n2, then the time interval Δt and the angle Δφ can be computed according to the equations (5) and (6)

$$\Delta t = (\log((\alpha P2 + nE)/(\alpha P2 + nA)))/\alpha P3 \quad (5)$$

$$\Delta\phi = nE - nA - \alpha P2 \cdot \Delta t \quad (6)$$

wherein αP2 and αP3 are here again parameters which are determined by the equations (7) and (8)

$$\alpha P2 = \alpha M/\alpha P3 - nG \quad (7)$$

$$\alpha P3 = (\alpha m - \alpha M)/(nmax - nG) \quad (8)$$

Accordingly, the total time interval δt and a total angle δφ can be determined by additionally taken into consideration the regions where the maximum acceleration αmax is constant. The total time interval δt is therefore the time required to accelerate the slave drive 2 with the maximum acceleration αmax to the reference rotation speed nR. The angle δφ is here the total rotation angle of the slave drive 2 during the total time interval δt. The expected position φ2E can then be readily determined as $$\phi 2E = \phi 2 + \delta\phi \quad (9)$$

The expected reference position φR' at that point in time can also be easily determined as $$\phi R' = \phi R + nR \cdot \delta t \quad (10)$$

In step S13, the controller 6 determines a difference Δ between the expected angular position φ2E and the corrected reference position φR'. Because the absolute difference Δ is unimportant in the present example, i.e., the angular position of the slave element 4 needs only be determined within one revolution or a fraction of a revolution, this difference can be reduced in step S14 to a modulo difference Δ'. If the master element 3 and/or the slave element 4 have symmetric properties, then N has an integer value of greater than one. If the master or slave element 3 is, for example, a three jaw chuck, then the integer value N is, for example, equal to three. Otherwise, the number N has a value of one.

In step S15, the controller 6 then checks if the modulo difference Δ' is greater than zero. If this is the case, i.e., the expected position φ2E leads the expected reference position φR', then step S16 is executed, otherwise step S17.

Step S16 uses different approaches. For example, the controller 6 can linearly scale the magnitude and the time dependence of the acceleration curve α(t), which is schematically shown in FIG. 7 for an exemplary scaling factor 0.66. The dashed line corresponds to the rotation speed n2 of the slave drive 2 for an acceleration with the maximum acceleration αmax, whereas the solid line represents the acceleration scaled by the scaling factor 0.66.

Alternatively, the controller 6 can also insert an acceleration pause tP before the acceleration curve α(t), as shown schematically in FIG. 8. The acceleration pause tP can be calculated as $$tP = \Delta'/(nR - n2) \quad (11)$$

Figure 9:
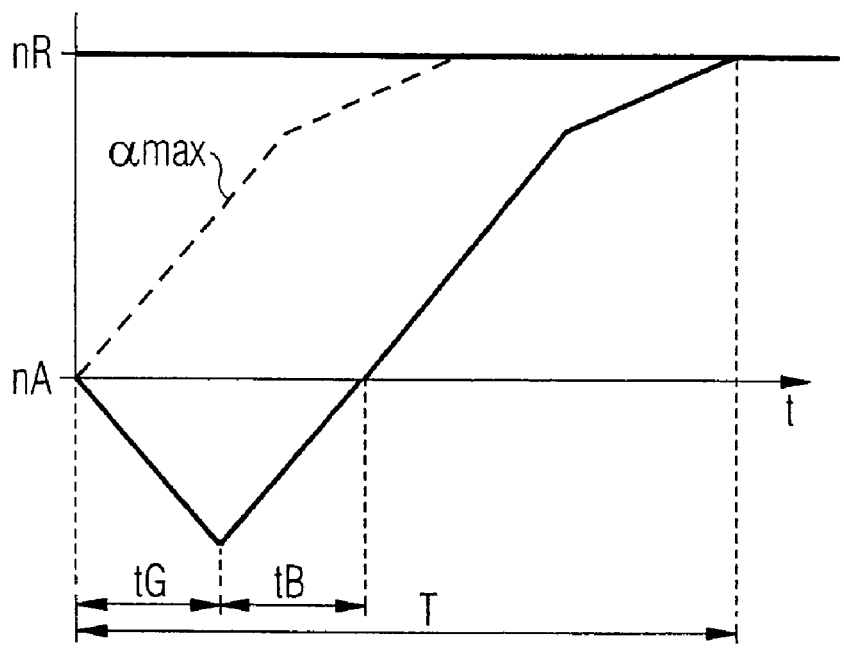

Alternatively, the controller 6 can insert before the acceleration curve α(t) a time interval tG with an opposing (or counter-) acceleration and an acceleration interval tB. This is shown schematically in FIG. 9.

These approaches may also be used in combination. For example, two or all three of the afore-described approaches can be implemented in step S16. In this case, step S18 follows the step S16, as shown in FIG. 6 by the dotted line. In step S18, the approach is selected that allows the slave drive 2 to reach the reference rotation speed nR and the reference position φR in an optimal time, i.e., within the shortest possible compensation time T.

Figure 10:
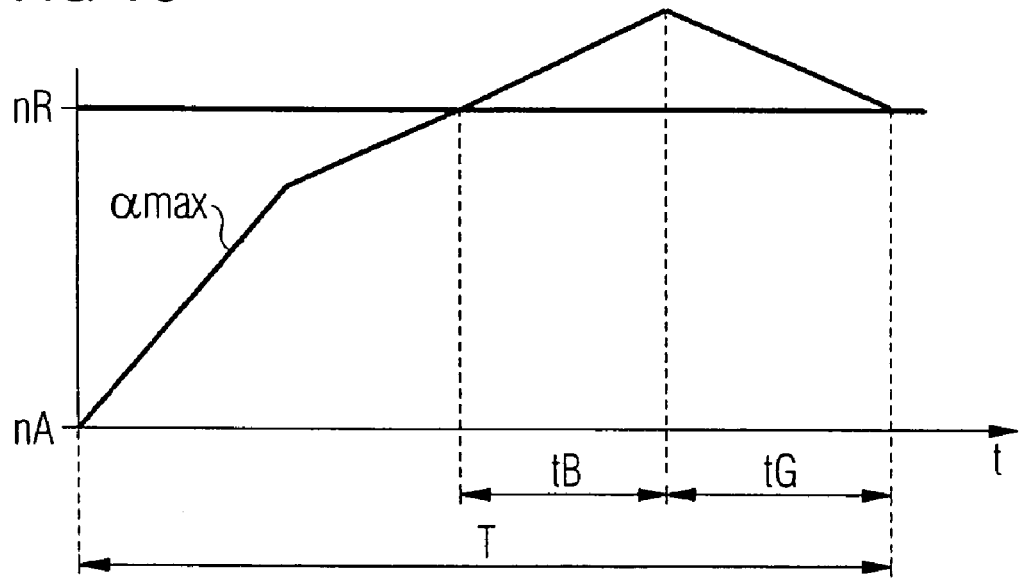

In step S17, the modulo difference Δ' is compensated by having the controller 6 append to the acceleration curve α(t) the acceleration time interval tB and the time interval tG for the counter-acceleration. This is schematically shown in FIG. 10.

The acceleration time interval tB and the time interval tG for the counter-acceleration mutually compensate each other in both the approach according to step S16 and in the approach according to step S17, as far as the effective change in the rotation speed n2 of the slave drive 2 is concerned. In addition, the acceleration and counter-acceleration during the time intervals tB, tG preferably have the largest values allowed for the drive.

In steps S16 and S17, the controller varies, based on the comparison and/or the modulo difference Δ', the determined acceleration curve α(t), so that the slave drive 2 can not only reach the reference rotation speed nR, but can simultaneously also reach the expected reference position φR'. It will be understood that the compensation time T can also be adjusted according to changes in the acceleration curve α(t). The expected reference position φR' is adjusted accordingly.

Alternatively to the approach described with reference to steps S15 to S18, an approach shown in the flow diagram of FIG. 11 can also be used.

According to FIG. 11, the controller 6 checks in step S21, which is similar to step S15 of FIG. 6, if the modulo difference Δ' is greater than zero. If the modulo difference Δ' is greater than zero, then the controller 6 executes steps S22 to S24. If the modulo difference Δ' is less than zero, then the controller 6 executes steps S25 to S27. In both cases, the controller 6 thereafter executes step S28.

In step S22, which is similar to step S16 of FIG. 6, the controller 6 determines for two or for all three of the approaches described above with reference to step S16 the corresponding acceleration curves α(t) and corresponding compensation times t1 to t3. The controller then decreases in step S23 the modulo difference Δ' by $2*\pi/N$. The modulo difference Δ' then becomes negative. In step S24, like in step S17 of FIG. 6, the controller 6 can therefore determine the corresponding acceleration curve α(t) and a corresponding compensation time t4 for the approach described above in conjunction with step S17.

Step S25 corresponds to step S24. Step S26 adds the modulo difference $2*\pi/N$, and step S27 corresponds to step S22.

In step S28, the acceleration curve α(t) with the shortest compensation time t1 to t4 is selected.

It will be understood that the approach according to FIG. 11 is only possible if the modulo difference Δ' can be used in the computation. This is not the case, then the approach described above with reference to FIG. 6 must be used.

The method of the invention can therefore provide a synchronous operation between two drives 1, 2. It should also be mentioned that details of the present invention, in particular the derivation of the equations (1) to (8), are included in the priority application, the content of which is therefore incorporated herein in its entirety.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for controlling a rotation speed of a slave drive, comprising the steps of:
   providing a reference rotation speed and a reference position to a controller for the slave drive,
   the controller determining, based on an instantaneous rotation speed, an instantaneous position and a maximum rotation-speed-dependent acceleration of the slave drive, an estimated acceleration curve for the slave drive, with the estimated acceleration curve for the slave drive being determined so that after an equilibration time, the rotation speed of the slave drive is equal to the reference rotation speed and the position of the slave drive is also equal to an expected reference position, which is determined by the controller based on the reference position, the reference rotation speed and the compensation time; and
   the controller controlling the slave drive according to the determined acceleration curve.

2. The method of claim 1, wherein the reference rotation speed or the reference position, or both, are provided to the controller continuously.

3. The method of claim 2, wherein the controller controls the slave drive so that the reference rotation speed is maintained after simultaneously reaching the reference rotation speed and the reference position.

4. The method of claim 1, wherein the reference rotation speed or the reference position, or both, correspond to desired values, expected values or actual values of a master drive.

5. The method of claim 1, wherein the controller determines the acceleration curve analytically.

6. The method of claim 1, wherein the slave drive has a constant maximum acceleration value below a ceiling speed and a smaller acceleration value above the ceiling speed.

7. The method of claim 6, wherein the maximum acceleration value of the slave drive above the ceiling speed is constant.

8. The method of claim 6, wherein the maximum acceleration value of the slave drive above the ceiling speed decreases with increasing rotation speed of the slave drive.

9. The method of claim 8, wherein the maximum acceleration value of the slave drive decreases linearly with increasing rotation speed above the ceiling speed.

10. The method of claim 8, wherein the maximum acceleration value of the slave drive decreases hyperbolically with increasing rotation speed above the ceiling speed.

11. The method of claim 1, wherein the slave drive drives a slave element and the reference position is determined modulo $2*\pi/N$, wherein N has an integer value.

12. The method of claim 1, wherein the controller initially sets the acceleration curve equal to a maximum acceleration value and determines an expected position of the slave drive assuming that the server drive is accelerated to the reference rotation speed with the set acceleration curve, and also sets a compensation time, wherein the controller compares the expected position with the expected reference position, and wherein the controller varies the acceleration curve based on the comparison and adapts the corresponding compensation time and the corresponding expected reference position accordingly, so that the slave drive simultaneously reaches the reference rotation speed and the expected reference position.

13. The method of claim 12, wherein the controller linearly scales the acceleration curve, if the expected position leads the expected reference position.

14. The method of claim 12, wherein the controller insert an acceleration pause before the acceleration curve, if the expected position leads the expected reference position.

15. The method of claim 12, wherein the controller inserts a counter-acceleration time interval and an additional acceleration time interval before the acceleration curve, if the expected position leads the expected reference position.

16. The method of claim 12, wherein the controller inserts an additional acceleration time interval and a counter-acceleration time interval after the acceleration curve, if the expected position trails the expected reference position.

17. The method of claim 1, wherein the controller determines the acceleration curve so that the slave drive reaches the reference rotation speed and the expected reference position time-optimized.

18. A controller for rotation speed control of a slave drive of a machine, wherein the controller
   receives a reference rotation speed and a reference position for the slave drive,
   determines, based on an instantaneous rotation speed, an instantaneous position and a maximum rotation-speed-dependent acceleration of the slave drive, an estimated acceleration curve for the slave drive, with the estimated acceleration curve for the slave drive being determined so that after an equilibration time, the rotation speed of the slave drive is equal to the reference rotation speed and the position of the slave drive is also equal to an expected reference position, which is determined by the controller based on the reference position, the reference rotation speed and the compensation time; and controls the slave drive according to the determined acceleration curve.

19. A machine with a controller for a slave drive according to claim 18.

* * * * *